Nov. 16, 1926.

W. N. HARTSHORN 1,607,535

DEPOSITOR FOR CHOCOLATE AND THE LIKE

Filed August 1, 1922  3 Sheets-Sheet 1

INVENTOR:
Willis N. Hartshorn
by MacLeod, Calver, Copeland & Dike
Attys.

Nov. 16, 1926.
1,607,535

W. N. HARTSHORN

DEPOSITOR FOR CHOCOLATE AND THE LIKE

Filed August 1, 1922    3 Sheets-Sheet 2

INVENTOR:
Willis N. Hartshorn
by MacLeod, Calver, Copeland & Dike
Attys.

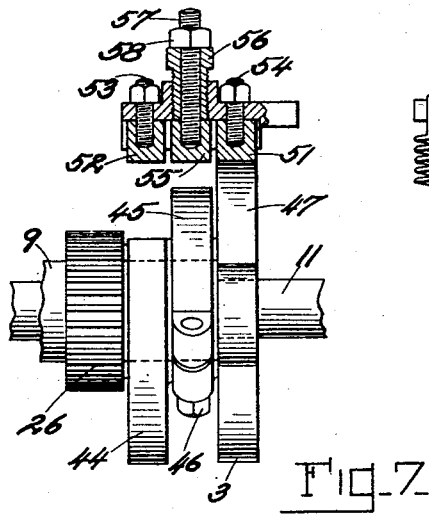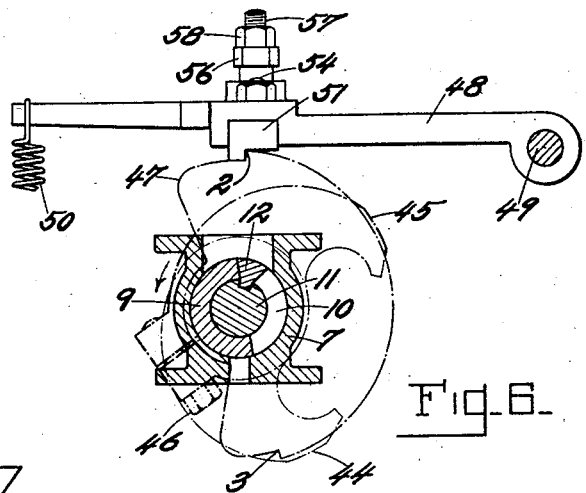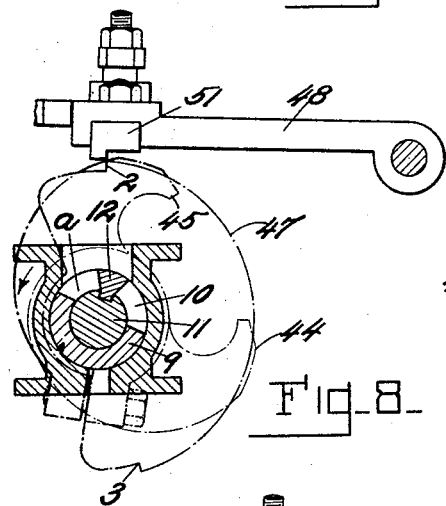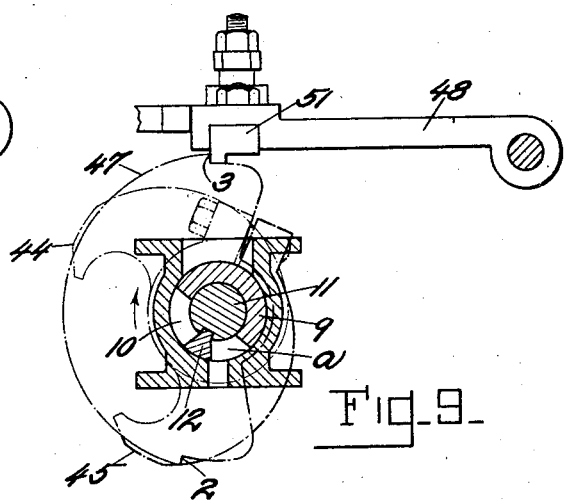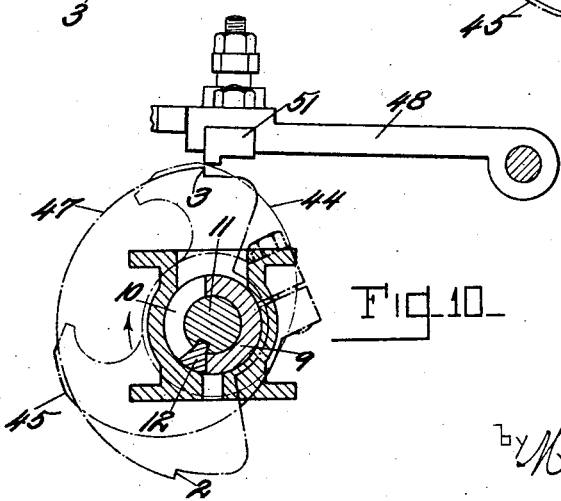

Patented Nov. 16, 1926.

1,607,535

UNITED STATES PATENT OFFICE.

WILLIS N. HARTSHORN, OF RACINE, WISCONSIN, ASSIGNOR TO RACINE CONFECTIONERS MACHINERY COMPANY, OF RACINE, WISCONSIN, A CORPORATION OF WISCONSIN.

DEPOSITOR FOR CHOCOLATE AND THE LIKE.

Application filed August 1, 1922. Serial No. 578,987.

My present invention has for its object an improvement in machines commonly known as chocolate depositors which are employed in the manufacture of chocolates and other forms of candies and cakes which are made from plastic material by its ejection through nozzles or orifices. So-called buds or stars made from chocolate are illustrations of goods made on such machines, but I do not limit myself to the particular uses mentioned herein. The machine embodying my present invention is an improvement on machines of the general type shown in the patent to Joseph M. Demerath No. 791,611, patented June 6, 1905.

The particular objects of the invention are to provide a more satisfactory mechanism which will permit the cleaning of the measuring mechanism, since, in machines as constructed at present, this cannot be satisfactorily accomplished; to provide means for substituting quickly and conveniently one measuring means for another; to provide more satisfactory means for regulating the size of the piece which is produced by varying the quantity of material taken in at each stroke; to provide automatically-operated mechanism for raising and lowering the plaques or other receiving articles in time with the action of the measuring mechanism while permitting a permanent adjustment of the carrier when required; and to provide driving mechanism which shall operate the moving parts of the machine more satisfactorily.

The invention will be fully understood from the following description when taken in connection with the accompanying drawings, and the novel features thereof will be pointed out and clearly defined in the claims at the close of this specification.

In the drawings, Fig. 1 is a side elevation of a depositor embodying my invention.

Fig. 6 is a transverse section of the measuring mechanism with its locking and releasing mechanism, showing the members about to open to receive the material to be deposited, the shaft being held from turning to the left by the locking mechanism.

Fig. 7 is a side view partly in section, of the parts shown in Figure 6.

Fig. 8 is a view similar to Figure 6 but showing the parts in receiving position.

Fig. 9 shows the parts in ejecting position.

Fig. 10 shows the position of the parts after the material has been ejected.

Figure 4:
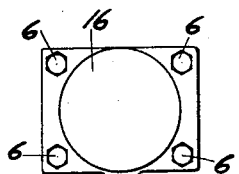
Fig. 4 is an end elevation of the parts as viewed from the right of Figure 3.
Figure 2:
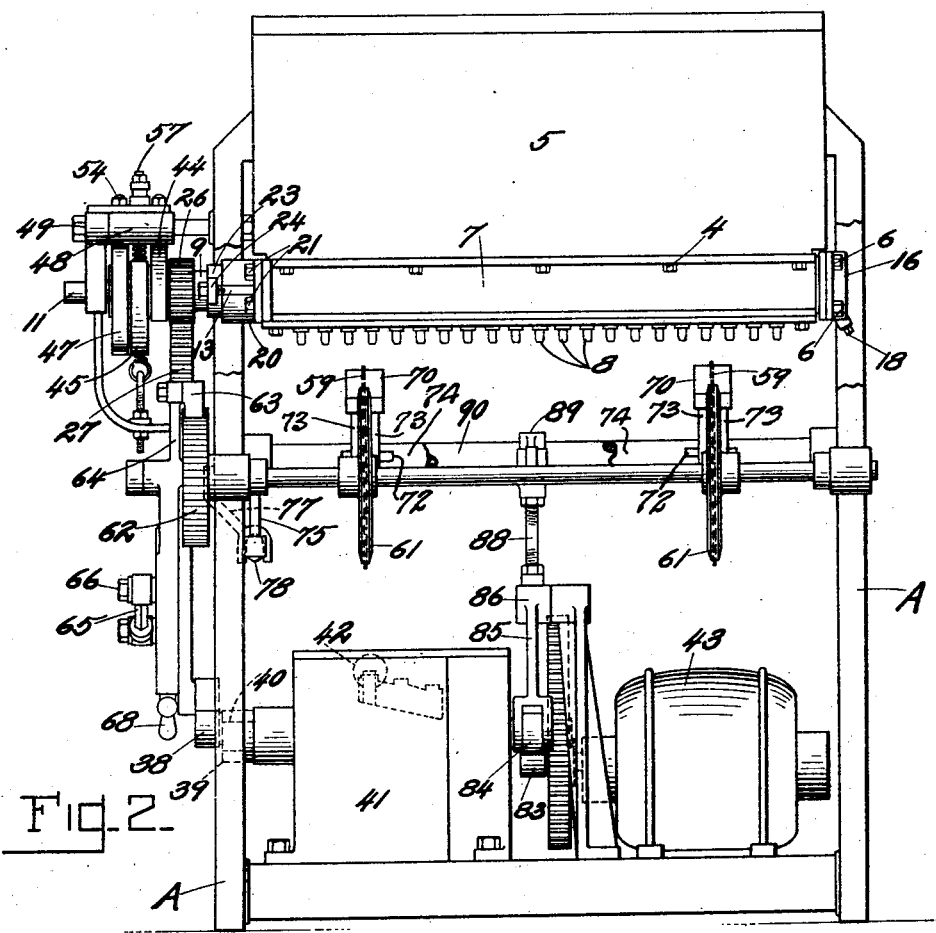
Fig. 2 is an end elevation of the machine as viewed from the right of Figure 1.

Referring now to the drawings, at A is indicated the frame of the machine which supports a hopper or reservoir 5 for the reception of the melted chocolate or other semi-liquid material to be deposited. To the base of the reservoir is secured by bolts 4 the measuring mechanism which comprises a casing 7 extending transversely of the machine and carrying a series of nozzles 8, as shown in Figure 2, through which the material is ejected. Within the casing 7 is a sleeve 9 having a series of openings 10. Within the sleeve 9 is a shaft 11 carrying a series of members referred to in the said Demerath patent as "radially extending wings or abutments", but which are perhaps more properly termed plungers 12, since they move back and forth in the openings 10 and perform the function of a piston in a cylinder. It will be understood that there is one plunger 12 for each opening 10 along the shaft 11, as shown in the Demerath patent. The sleeve 9 is turned down at the right-hand end (see Fig. 3), and has secured to it by set screws 14 a collar 15 which is itself larger than the bore of the casing 7. Outside of these parts is placed a cap 16 which is bolted to the end of the casing 7 as by cap screws 6 (see Figure 4). This cap has a drain hole 17 closed by a plug 18 through which any condensation or leakage can escape. The cap is provided on the inside with a boss 96 which abuts against the end of the shaft and furnishes a thrust bearing, preventing movement of the shaft to the right.

Figure 3:
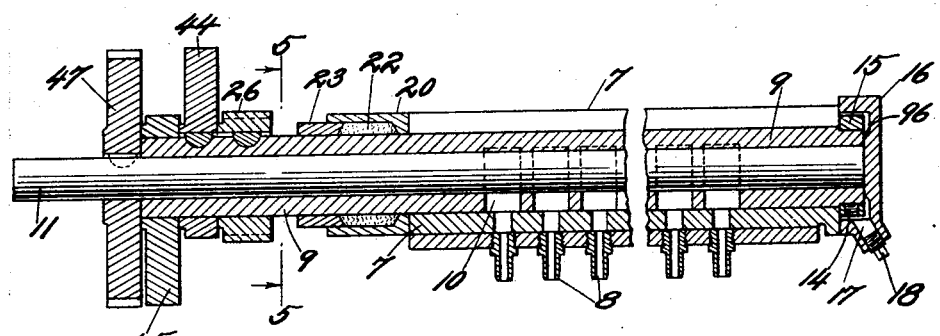
Fig. 3 is a longitudinal section illustrating the novel construction of the measuring mechanism and the locking and releasing mechanism therefor.

From the foregoing it will be seen that by removing the cap 16 and the collar 15, and some of the other parts not necessary to be described, the sleeve 9 and shaft 11 can be drawn out of the casing toward the left, as shown in Figure 3. Furthermore, by removing the bolts 4 which hold the casing to the hopper and disconnecting some other parts, the entire measuring mechanism can be taken off and another substituted for it. This is convenient as it is sometimes desirable to have measuring mechanism with different ranges of capacity.

Figure 5:
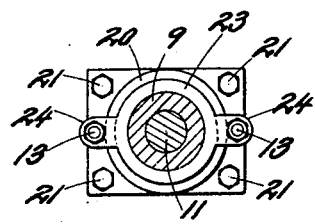
Fig. 5 is a section taken on line 5—5 of Figure 3.

To prevent leakage at the other end and at the same time provide a mechanism which will not interfere with the removal of the sleeve and shaft as described, I employ a novel type of stuffing box. The stuffing box proper is designated 20 and is separable from the casing 7 but secured to it by cap screws 21, 21, passing through flanges on the side of the stuffing box, as shown in Figures 2 and 5. Within the stuffing box is a packing 22 which is compressed by a gland 23 provided with lugs 24 (see Figures 2 and 5) through which pass bolts 13. This construction is such that when it is necessary to withdraw from the casing the sleeve 9 and the shaft 11, it is only necessary to remove the cap screws 21. The stuffing box then comes off with the shaft and need not be disturbed. This does away with the necessity for pulling the parts out through the stuffing box.

It will be understood that the sleeve 9 is oscillated positively by mechanism which will now be described, while the shaft 11 is oscillated in proper time in relation to the sleeve by frictional engagement therewith, being held against movement during certain portions of the oscillations of the sleeve by cam mechanism which will be described later.

Keyed to the sleeve 9 is a pinion 26 which meshes with a gear sector 27 pivoted at 28 to the frame of the machine. This gear sector 27 has a rearwardly extending arm 29 which is slotted, as shown at 30. In this slot is an adjustable block 31 carrying a pivot 32 for engagement with an adjustable link 33. The block 31 is adjustable in the slot 30 by means of a thumb screw 34. The lower end of the link 33 is connected at 35 to a bell-crank sector 36 pivoted at 37. The bell-crank sector is moved by a connecting rod 38 and crank 39 on the main shaft 40 of a gear box 41 in which is a change speed gear controlled by a hand lever 42. This change speed gear is of ordinary construction and provides three speeds between the electric motor 43 or other source of motive power and the main shaft 40. As the change speed gear may be of any standard construction, it will not be described in detail herein. This driving mechanism for the measuring devices is much superior to the mechanism heretofore employed because it provides a smooth operation for the parts within the range of speeds intended and does not result in jerking, pounding or overloading due to "toggling" or dead centers as has been found to be the case in mechanisms formerly commonly employed.

The cam mechanism by which the shaft 11 is given its movements relative to the sleeve 9, will now be described. On the sleeve 9 and adjacent the pinion 26 is a lifting cam 44 which is fast thereon. Adjacent this is a second lifting cam 45 which is adjustable on the sleeve by means of the cap screw 46. On the shaft 11 and adjacent the cam 45 is a latch cam 47 which is fixed to the shaft and has two notches 2 and 3 in its surface. Above the edges of these three cams is a lever 48 pivoted at 49 to the frame of the machine and held down by a spring 50. This lever carries thereon a latch 51 secured thereto by a bolt 54. The latch 51 cooperates with the notches 2 and 3 in the latch cam 47. Adjacent the latch 51 are two blocks 55 and 52, of which the former is adjustable vertically on the lever 48 by means of a screw-threaded thimble 56, bolt 57 and jamb nut 58. This block cooperates with the cam 45. The latch 51 serves to prevent movement of the shaft 11 except when lifted out of contact with the latch cam by means of the lifting cams 44 and 45.

The operation of these devices will be seen from Figures 6 to 10 inclusive. Starting with the parts in the position shown in Figure 6, at which time the latch 51 is in engagement with the notch 2 in the latch-cam 47 and holds the shaft 11 stationary, this being the position of the parts before the measuring opening is filled with the mixture, the action is as follows:—

The rotation of the sleeve 9 by the pinion 26 continues, the shaft 11 being held stationary, until the parts are in the position shown in Figure 8 when the measuring opening $a$ fills with chocolate from the hopper. When the parts reach this point, the lifting cam 45 strikes the block 55 and raises the lever 48, disengaging the latch 51 from the cam 47 and permitting the shaft 11 to turn with the sleeve 9 until the parts arrive at the position shown in Figure 9, at which time the latch 51 engages the other notch 3 in the cam 47. The shaft 11 is again held immovable. The sleeve 9 now turns in the reverse direction, as shown in Figure 10, closing the opening $a$ and ejecting the mixture from it. The shaft is held stationary until the parts reach the position shown in Figure 10 when the lifting cam 44 raises the latch lever 48 and permits the shaft to turn with the sleeve until the parts again reach the position shown in Figure 6, and the cycle of operation is completed.

The cam devices just described are important because they provide convenient and efficient means of adjustment and regulation which was impossible with the machine as heretofore constructed. The capacity of the measuring opening $a$ is adjusted by shifting the position of the lifting cam 45 angularly on the sleeve 9. This provides a coarse adjustment. A finer adjustment is provided by moving the cam block 55 up or down by means of the screw-threaded thimble 56 and bolt 57. If the block is moved down, the latch will be lifted earlier and consequently the capacity of the measuring opening *a* will be reduced.

The machine embodying the present invention is intended to fill molds of varying depths or to make deposits on the surface of a moving table. For the former purpose it is essential to support the plaques or molds by means adjustable toward and away from the nozzles; for the second purpose, it is necessary that automatic mechanism be provided by which the table shall be moved up into proximity with the nozzles just before the ejection of the material and lowered away from the nozzles immediately afterwards, remaining in this position during the advance movement of the table. The mechanism for accomplishing these results will now be described.

At 59, 59, is shown a pair of endless chains which may be employed to carry plaques or molds (not shown) on which the material may be directly deposited. These endless chains run over front sprockets 60 and rear sprockets 61. They are given a step-by-step motion by driving mechanism comprising a ratchet 62 and pawl 63 carried by an arm 64 which is actuated by an adjustable connecting rod 65. The point of connection 66 between the connecting rod 65 and arm 64 is variable by means of a screw 67 and handle 68. The other end of the connecting rod 65 is adjustably connected at 69 to the bell-crank sector 36 already previously described.

Figure 1:
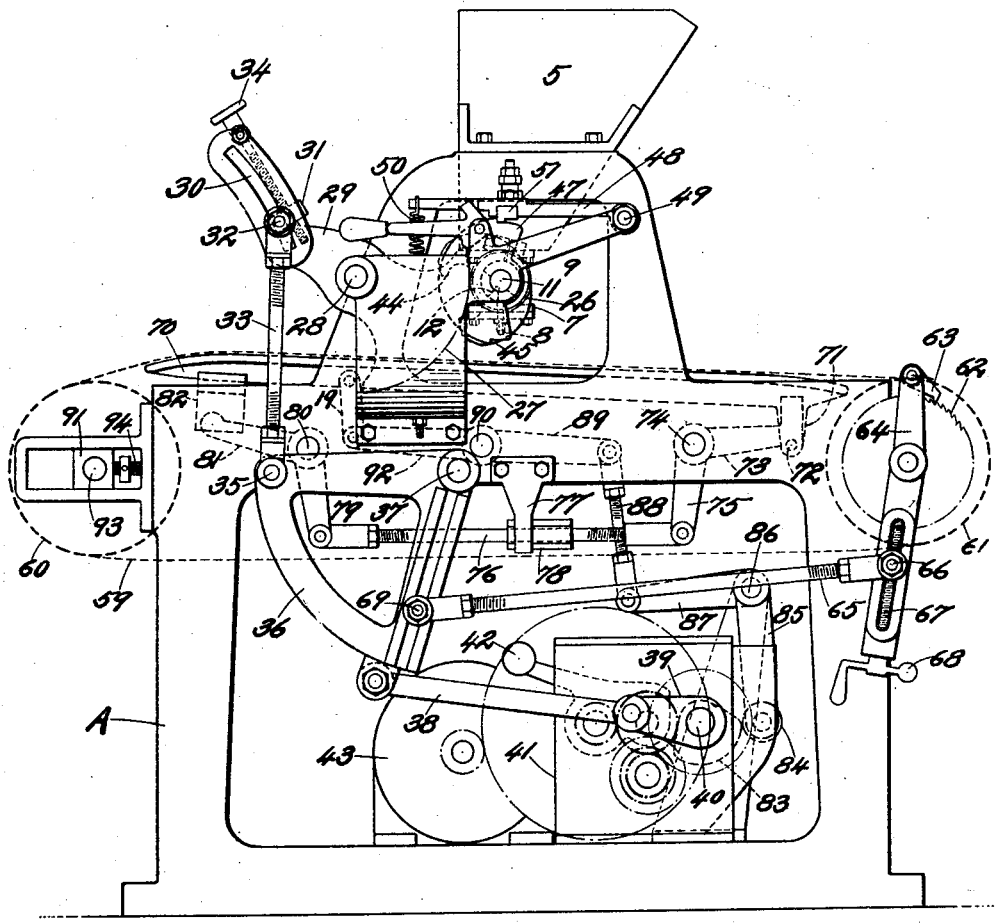

The endless chains 59 run over a pair of parallel tracks 70, one of which is shown in Figure 1. Vertical adjustment of these tracks varies the distance of the plaque or other receiving device from the orifice of the nozzles 8. The right-hand end (as shown in Fig. 1) of each of these parallel tracks is provided with a lug 71 which extends downwardly and is pivoted at 72 to an arm 73 on a transverse rock shaft 74 journalled in the frame of the machine. A third arm 75 on the rock shaft 74, and forming with each of the arms 73 a bell crank, is attached to an adjustable connecting rod 76 passing through a lug 77 secured to the frame of the machine. The connecting rod 76 is screw-threaded at its ends, as shown in the drawings, and is provided with a hexagonal wrench-receiving portion 78 by which it may be rotated to adjust its length. The other end of the connecting rod 76 is attached to an arm 79 on a second transverse rock shaft 80 journalled in the frame of the machine. The rock shaft 80 is provided with arms 81 each forming with the arm 79 a bell crank, and each of which supports a downwardly projecting grooved member 82 secured to the underside of one of the parallel tracks 70. The grooves in the members 82 prevent lateral displacement of the tracks 70. From the foregoing it will be seen that by turning the connecting rod 76, its length will be increased or diminished and the vertical position of the parallel tracks 70 will be changed accordingly. This provides the adjustment for different depths of molds when the receiving member is not to be raised or lowered automatically in time with the successive deposits.

If, however, it is desired to have the receiving device automatically raised and lowered in time with the successive deposits, the tracks are adjusted to about their lowest position as already described, and the mechanism which will now be described is employed. On the main shaft 40 is a cam 83 contacting with a cam follower 84 on one arm 85 of a bell crank pivoted at 86 to the frame of the machine. The other arm 87 is connected to an adjustable link 88 and through it to one arm 89 of a rock shaft 90, the other arms 92 being connected by links 19 to the tracks 70. From the foregoing it will be seen that each rotation of the main shaft 40 moves the rock shaft 90 and thus lifts the left-hand end of the parallel track 70, the right-hand end being then fixed and swinging about the pivot 72.

To permit the vertical adjustment of the endless chains by means of the vertical movement of the tracks 70, I provide bearings 91 for the shaft 93 of the sprocket wheels 60, and a screw 94 to regulate the movement of the said bearings.

What I claim is:—

1. In combination with the nozzles of a depositor, a track to support the receiving means, and adjusting mechanism for said track comprising a pair of bell crank levers one arm of each of which acts on the respective ends of the track, and adjusting means acting on the other arms of the bell crank levers.

2. In combination with the nozzles of a depositor, a track to support the receiving means, and adjusting mechanism comprising a pair of bell crank levers one arm of each of which acts on the ends of the track, and adjusting means connecting the other arms of the said bell crank levers.

3. In a machine of the character described and in combination with the nozzles of a depositor, a track to support the receiving means, means acting on the opposite ends of the track to adjust it vertically relative to the nozzles of the depositor, common operating means for said track adjusting means, and means for reciprocating said track toward and from said nozzles.

4. In combination with a depositor, a track for supporting the receiving means, two bell cranks furnishing supports for the track, hand adjustable means for changing the position of the bell cranks, said track being pivoted to one of the said bell cranks and capable of resting on the other, and means operated in time with the depositor for giving the track a swinging motion about the said pivotal connection with the one bell crank independent of the other bell crank.

5. In a depositor, a casing, a sleeve insertable in the casing, a shaft in the sleeve, a collar on the sleeve larger than the bore through the casing and a cap detachably secured to the said casing and engaging the ends of said sleeve and shaft.

6. In a depositor, a casing, a sleeve insertable in the casing, a shaft in the sleeve, a collar on the sleeve larger than the bore through the sleeve, and a cap covering said head and collar and having a boss thereon furnishing a thrust bearing for the shaft.

7. In a depositor, a casing, a sleeve therein, a shaft within the said sleeve and means for oscillating the shaft and sleeve, comprising a latch cam on the shaft, lifting cams on the sleeve and a latch member having portions in the path of the two lifting cams and another portion in the path of the latch cam, one of the portions of the latch member in the path of the lifting cams being adjustable independently of the other.

8. In a depositor, a casing, a sleeve therein, a shaft within said sleeve, and means for oscillating the shaft and sleeve comprising a latch cam on the shaft, lifting cams on the sleeve, and a latch member having portions in the path of the two lifting cams and another portion in the path of the latch cam, one of said lifting cams being adjustable on the sleeve and the corresponding portion of the latch member being adjustable independently of the other portions of the latch member.

In testimony whereof I affix my signature.

WILLIS N. HARTSHORN.